(12) United States Patent
Cormode et al.

(10) Patent No.: US 7,783,647 B2
(45) Date of Patent: Aug. 24, 2010

(54) METHOD AND APPARATUS FOR GLOBALLY APPROXIMATING QUANTILES IN A DISTRIBUTED MONITORING ENVIRONMENT

(75) Inventors: Graham R. Cormode, Summit, NJ (US); Minos N. Garofalakis, San Francisco, CA (US); Shanmugavelayutham Muthukrishnan, Washington, DC (US); Rajeev Rastogi, Bangalore (IN)

(73) Assignees: Alcatel-Lucent USA Inc., Murray Hill, NJ (US); Rutgers, The State University of New Jersey, New Brunswick, NJ (US)

( * ) Notice: Subject to any disclaimer, the term of this patent is extended or adjusted under 35 U.S.C. 154(b) by 968 days.

(21) Appl. No.: 11/301,387

(22) Filed: Dec. 13, 2005

(65) Prior Publication Data

US 2007/0136285 A1 Jun. 14, 2007

(51) Int. Cl.
*G06F 17/30* (2006.01)
(52) U.S. Cl. .................. 707/752; 707/780
(58) Field of Classification Search .......... None
See application file for complete search history.

(56) References Cited

U.S. PATENT DOCUMENTS 5,835,763 A * 11/1998 Klein ..................... 718/101
6,768,969 B1 * 7/2004 Nikitin et al. ............ 702/188
6,820,090 B2 * 11/2004 Chambers et al. ......... 707/101
2006/0161402 A1 * 7/2006 Radulovic et al. ........ 702/189

OTHER PUBLICATIONS

"Effective Computation of Biased Quantiles over Data Streams", Cormode et al., p. 5-8, Apr. 2005.*

* cited by examiner

*Primary Examiner*—Neveen Abel Jalil
*Assistant Examiner*—Kellye D Buckingham
(74) *Attorney, Agent, or Firm*—Wall & Tong, LLP (57) ABSTRACT

The invention comprises a method and apparatus for determining a rank of a query value. Specifically, the method comprises receiving a rank query request, determining, for each of the at least one remote monitor, a predicted lower-bound rank value and upper-bound rank value, wherein the predicted lower-bound rank value and upper-bound rank value are determined according to at least one respective prediction model used by each of the at least one remote monitor to compute the at least one local quantile summary, computing a predicted average rank value for each of the at least one remote monitor using the at least one predicted lower-bound rank value and the at least one predicted upper-bound rank value associated with the respective at least one remote monitor, and computing the rank of the query value using the at least one predicted average rank value associated with the respective at least one remote monitor.

17 Claims, 4 Drawing Sheets

METHOD AND APPARATUS FOR GLOBALLY APPROXIMATING QUANTILES IN A DISTRIBUTED MONITORING ENVIRONMENT

FIELD OF THE INVENTION

The invention relates to the field of data management applications and, more specifically, to approximation of quantiles in distributed monitoring environments.

BACKGROUND OF THE INVENTION

In general, traditional data management applications (e.g., managing sales records, transactions, inventory, and the like) typically require database support for a variety of one-shot queries in which data processing is done once in response to a posed query. As such, traditional database systems are typically optimized for performance based on one-shot queries. In recent years, however, the emergence of a new class of large-scale event monitoring applications has introduced numerous data management challenges. As opposed to one-shot queries, emerging large-scale monitoring applications require continuous tracking of complex aggregates and data distribution summaries over collections of physically distributed streams.

For example, a network operations center (NOC) for an Internet Protocol backbone network of a large Internet Service Provider typically monitors hundreds of routers, thousands of links and interfaces, as well as various events at different layers of the network infrastructure (e.g., fiber-cable utilizations, packet forwarding at routers, and the like). As such, the NOC must continuously track patterns of usage levels in order to detect and react to traffic floods, link failures, network intrusions, network attacks, and the like. Unfortunately, existing solutions for continuously monitoring distributed tracking environments tend to be space inefficient (at each remote monitoring site), communication inefficient (across the underlying communication network), and unable to provide continuous, guaranteed-quality estimates.

In general, recent work on data stream processing has focused on developing space-efficient, one-pass algorithms for performing various centralized, one-shot computations on massive data streams. Unfortunately, since such existing methods work in a centralized, one-shot setting, the methods do not optimize communication efficiency. Furthermore, although recent solutions include methods that optimize site communication costs for approximating different queries in a distributed setting, the underlying assumption of such methods is that the computation is triggered either periodically or in response to a one-shot request. As such, existing techniques are not applicable to a continuous monitoring environment in which the goal is to continuously provide guaranteed-quality estimates over a distributed collection of data streams.

SUMMARY OF THE INVENTION

Various deficiencies in the prior art are addressed through the invention of a method and apparatus for determining a rank of a query value. Specifically, a method according to one embodiment of the invention comprises receiving a rank query request, determining, for each of the at least one remote monitor, a predicted lower-bound rank value and upper-bound rank value, wherein the predicted lower-bound rank value and upper-bound rank value are determined according to at least one respective prediction model used by each of the at least one remote monitor to compute the at least one local quantile summary, computing a predicted average rank value for each of the at least one remote monitor using the at least one predicted lower-bound rank value and the at least one predicted upper-bound rank value associated with the respective at least one remote monitor, and computing the rank of the query value using the at least one predicted average rank value associated with the respective at least one remote monitor.

BRIEF DESCRIPTION OF THE DRAWINGS

The teachings of the present invention can be readily understood by considering the following detailed description, in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a distributed monitoring environment comprising a plurality of remote monitors and a centralized quantile tracking system; however, the methodology of the invention can readily be applied to other distributed monitoring environments. In general, the present invention employs a combination of local quantile monitoring at remote sites and prediction models for local site behavior in order to produce highly communication-efficient and space-efficient solutions. In other words, the present invention comprises various distributed monitoring methodologies for maintaining accurate quantile estimates with provable approximation guarantees, while simultaneously optimizing remote monitor storage space as well as network communication costs.

In general, the present invention enables continuous monitoring of approximate, guaranteed-quality summaries of a complete data distribution over a plurality of distributed data streams. In one embodiment, approximate guaranteed-quality summaries comprise approximate quantile summaries of an overall data distribution (i.e., equi-depth histograms). In general, quantiles comprise a general form of holistic aggregates over an underlying distribution. As such, quantiles subsume other holistic-aggregate functions, such as heavy hitters (i.e., monitoring of quantiles enables monitoring of heavy hitters using on the same information).

Figure 1:
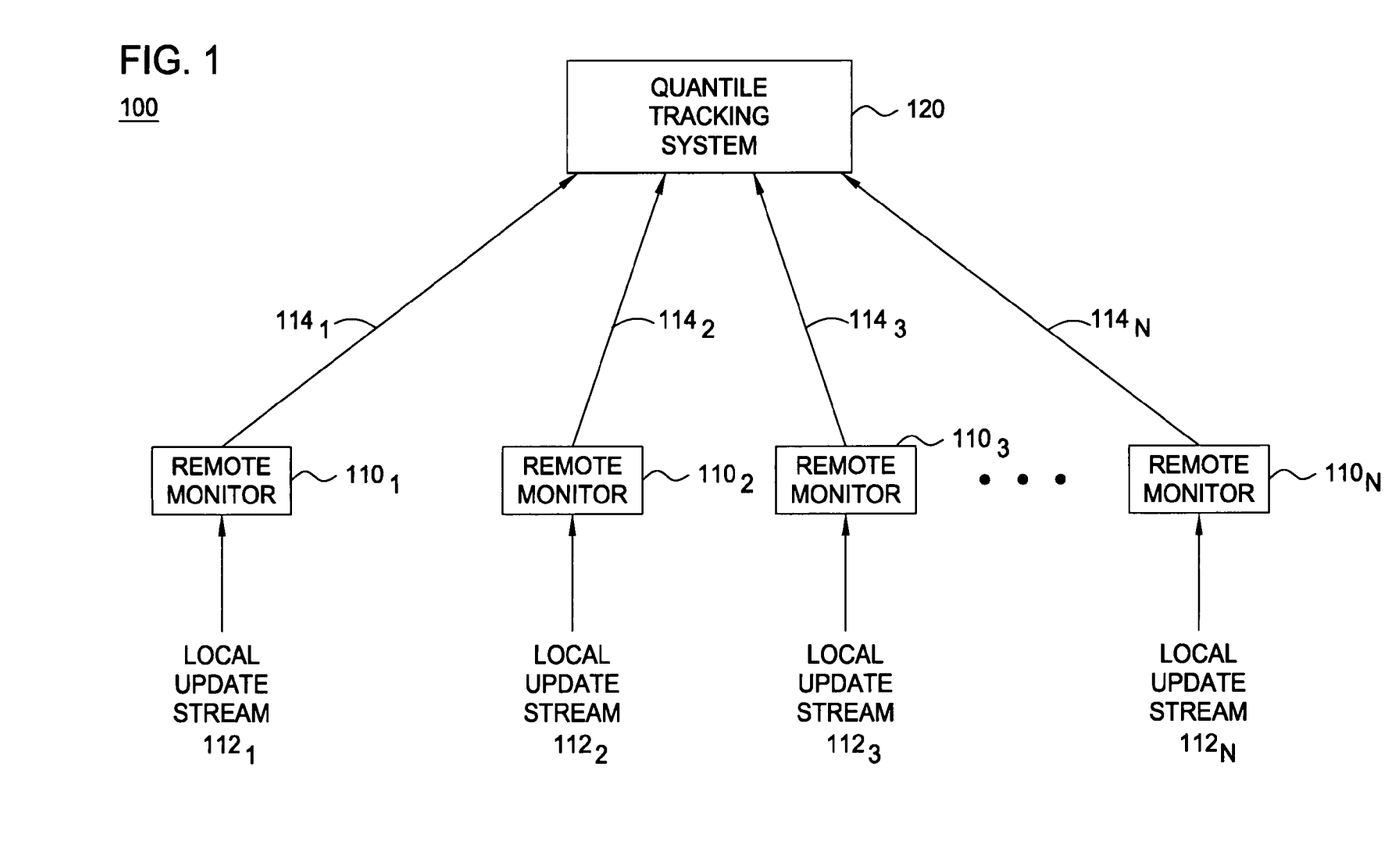
FIG. 1 depicts a high-level block diagram of a distributed monitoring environment.

FIG. 1 depicts a high-level block diagram of a distributed monitoring environment. Specifically, distributed monitoring environment 100 of FIG. 1 comprises a plurality of remote monitors (RMs) $110_1$-$110_N$ (collectively, RMs 110) and a quantile tracking system (QTS) 120. As depicted in FIG. 1, the RMs 110 receive a respective plurality of local update streams (LUSs) $112_1$-$112_N$ (collectively, LUSs 112). Similarly, as depicted in FIG. 1, the RMs 110 transmit a respective plurality of state update messages (SUMs) $114_1$-$114_N$ (collectively, SUMs 114) to QTS 120.

As depicted in FIG. 1, the LUSs 112 comprise respective data streams, wherein each of the data streams comprises respective data elements. In one embodiment, data elements arrive at the RMs 110 via LUSs 112 continuously. In another embodiment, data elements arrive at the RMs 110 via LUSs 112 periodically. In one embodiment, in order to reduce network communications required for performing approximate quantile queries, direct communication between RMs 110 is prohibited; rather, the RMs 110 exchange messages (e.g., SUMs 114) only with QTS 120. As such, the RMs 110 provide QTS 120 with quantile information associated with respective LUSs 112.

As depicted in FIG. 1, the RMs 110 process respective LUSs 112 in order to render a respective plurality of multi-sets of data elements $S_j$ (i.e., frequency distributions, where $j=1,\ldots,N$) over data elements received via the LUSs 112. For example, for Internet Protocol (IP) routers monitoring the number of connections between source and destination IP addresses, the domain of the received data elements comprises the domain of 64-bit (source, destination) IP address pairs, and $S_j$ captures the frequency of specific IP address source-destination pairs observed at router j. In other words, $S_j$ may be used to denote a multi-set of data elements received by $RM_j$ via the associated $LUS_j$.

In one embodiment, the data elements received at the RMs 110 via the LUSs 112 comprise data element insertions. In this embodiment, insertion of data element v in multi-set $S_j$ associated with $RM_j$ results in an increase of +1 in the net frequency of v in multi-set $S_j$. In another embodiment, data elements received at the RMs 110 via the LUSs 112 comprise data element insertions and data element deletions. In this embodiment, insertion of a data element v in multi-set $S_j$ associated with $RM_j$ comprises an increase of +1 in the net frequency of data element v in multi-set $S_j$. Similarly, deletion of data element v from multi-set $S_j$ comprises a decrease of −1 in the net frequency of data element v in multi-set $S_j$. As such, LUSs 112 comprising general updates (i.e., data element insertions and deletions) enables monitoring of the LUSs 112 over sliding windows by issuing delete operations for expired data elements in a particular LUS (i.e., data elements that are no longer in a window of interest at the associated RM 110).

As depicted in FIG. 1, the SUMs 114 comprise state update messages for enabling QTS 120 to generate approximate answers to queries over the union of all remotely-monitored LUSs 112. Since the SUMs 114 received by QTS 120 comprise data elements from each of the respective local multi-sets $S_j$, the QTS 120 monitors global update multi-set S (i.e., the union of each of the local multi-sets $S_j$ received via the respective SUMs 114). Using the methodologies of the present invention, the amount of data transmitted from the RMs 110 to QTS 120 represents only a small fraction of the total number of data elements received by the RMs 110 via the LUSs 112 (detected by the RMs 110). Furthermore, as the number of data elements received by the RMs 110 increases, the fraction of data transmitted from the RMs 110 to QTS 120 is further reduced, enabling significant communications savings.

Using the methodologies of the present invention, QTS 120 responds to queries (e.g., absolute rank queries, quantile rank queries, and the like) on the frequency distribution of the global collection of data elements received via the LUSs 112 (i.e., the global update multi-set S). In order to operate the distributed monitoring environment 100 of FIG. 1 as a continuous querying environment, QTS 120 continuously monitors the approximate quantiles of $S_j$. Similarly, QTS 120 continuously monitors the approximate quantiles of $S_j$ in order to reduce communication costs associated with transmitting every data element update received via the LUSs 112 to QTS 120.

As such, the methodologies of the present invention enable an effective tradeoff (in a precise, quantitative manner) between communication efficiency and quantile approximation accuracy. In other words, configuring larger error tolerances for the approximate quantiles at QTS 120 enables smaller communication overhead, thereby insuring continuous approximate monitoring of the LUSs 112. As such, in one embodiment, strong guarantees on the quality of the approximation may be achieved.

In accordance with the methodologies of the present invention, r(v) denotes the absolute rank of data element v (i.e., a data element of value v) in global update multi-set S, and q(v) denotes the quantile (i.e., relative) rank of data element v in global update multi-set S. Furthermore, using a pre-specified error tolerance $\epsilon$, the present invention continuously maintains an $\epsilon$-approximate global quantile summary Q(S) of the global frequency distribution of global update multi-set S, while minimizing the overall amount of communication between QTS 120 and the respective RMs 110.

Furthermore, by providing a continuous $\epsilon$-approximation guarantee, QTS 120 may utilize the global quantile summary Q(S) to answer at least one of: an $\epsilon$-approximate quantile-rank query (i.e., an approximate quantile rank that falls within $\epsilon$ of the true quantile rank of data element v within multi-set S), an $\epsilon$-approximate quantile-value query (i.e., determining a data element v having a true quantile rank in global multi-set S that falls within $\epsilon$ of q), an $\epsilon$-approximate absolute-rank query, an $\epsilon$-approximate absolute-value query, and like queries as known in the art.

In general, the distributed quantile monitoring methodologies of the present invention require each of the RMs 110 to continuously monitor the quantiles of the respective LUSs 112. In one embodiment, if a certain amount of change is observed locally at $RM_j$ (i.e., at one of the RMs 110) the $RM_j$ may communicate with QTS 120 in order to update the QTS 120 with more recent information with respect to the $LUS_j$ associated with $RM_j$. As such, the present invention enables accurate $\epsilon$-approximation guarantees for queries over the global update multi-set S (i.e., the union of the LUSs 112 associated with the RMs 110) while minimizing the amount of communication required between the RMs 110 and QTS 120.

In other words, using the methodologies of the present invention, rather than transmitting the complete frequency distribution of the respective LUSs 112 to QTS 120, the RMs 110 only transmit concise local quantile summaries $Q(S_j)$ of the respective LUSs 112 to the QTS 120. The methodologies of the present invention are performed such that, provided that the local quantile distributions at the RMs 110 remain substantially the same, communication from the RMs 110 to QTS 120 is not required. In one embodiment, implementation of this property relies on the use of prediction models that accurately represent the true behavior of the LUSs 112.

Although RMs 110 only communicate summary information associated with the LUSs 112 (i.e., the local quantile summaries $Q(S_j)$) to QTS 120, as the number of RMs 110 increases, the communication penalty for updating QTS 120 with local quantile summaries from each of the RMs 110 becomes inordinately high. As such, in one embodiment, global synchronization among the RMs 110 (i.e., broadcasting local quantile summaries between the RMs 110) is avoided. As described herein, the RMs 110 continuously monitor local constraints on the local quantile distributions of respective LUSs 112 (using processing on local quantile summaries $Q(S_j)$), and transmit corresponding quantile summaries to QTS 120 in response to a determination that the local constraints on the local quantile distributions are violated.

In one embodiment, using the quantile monitoring methodologies of the present invention, the allowed global quantile approximation error tolerance $\epsilon$ is split into components $\Phi$ and $\Theta$ such that $\epsilon=\Phi+\Theta$. In this embodiment, $\Phi$ comprises the error associated with the local quantile summaries $Q(S_j)$ communicated from the respective RMs 110 to QTS 120. Similarly, in this embodiment, $\Theta$ comprises an upper bound on the deviation of local quantiles at each of the RMs 110 based on locally-observed data element updates received by the respective RMs 110 since the last communication by the RMs 110 to the QTS 120.

In other words, a local quantile summary $Q(S_j)$ last communicated to QTS 120 at time t comprises an approximation error on the order of $\Phi$ with respect to the snapshot of $LUS_j$ at time t, whereas $\Theta$ bounds the deviation of local quantiles with respect to the local quantile summary $Q(S_j)$ transmitted to QTS 120 since time t. As such, a larger $\Theta$ value allows for larger local deviations since the last communication to QTS 120 and, therefore, implies fewer communications from the respective RMs 110 to QTS 120; however, since $\epsilon=\Phi+\Theta$, for a given error tolerance $\epsilon$, the size of the $\Phi$-approximate local quantile summary $Q(S_j)$ sent during each communication to QTS 120 is larger.

Since each local quantile summary $Q(S_j)$ communicated to QTS 120 at time t gives a $\Phi$-approximate snapshot of $LUS_j$ at time t, the prediction model employed at the RMs 110 may be communicated from the RMs 110 to QTS 120 (along with the local quantile summaries), thereby enabling QTS 120 to accurately predict the anticipated behavior of the LUSs 112. In other words, QTS 120 employs the prediction model for site j (in conjunction with the most recent local quantile summary $Q(S_j)$ received from $RM_j$) in order to predict the current state of $LUS_j$ during estimation of global quantiles across all LUSs 112 (i.e., estimating the global quantiles for global update multi-set S). Similarly, $RM_j$ employs the same prediction model in order to predict the deviation of the local quantiles with respect to the quantile predictions performed by QTS 120.

As such, as long as the prediction models accurately capture the local update behavior at the RMs 110, no communication from the RMs 110 to QTS 120 is required. It should be noted that each prediction model is configured according to local information associated with the respective RMs 110. In one embodiment, the prediction model associated with a RM 110 is computed by that RM 110. In another embodiment, the prediction model associated with a RM 110 is computed by QTS 120 and transmitted to the RM 110 for enabling the RM 110 to perform local quantile monitoring, local quantile summary computations, and like functions.

Figure 2:
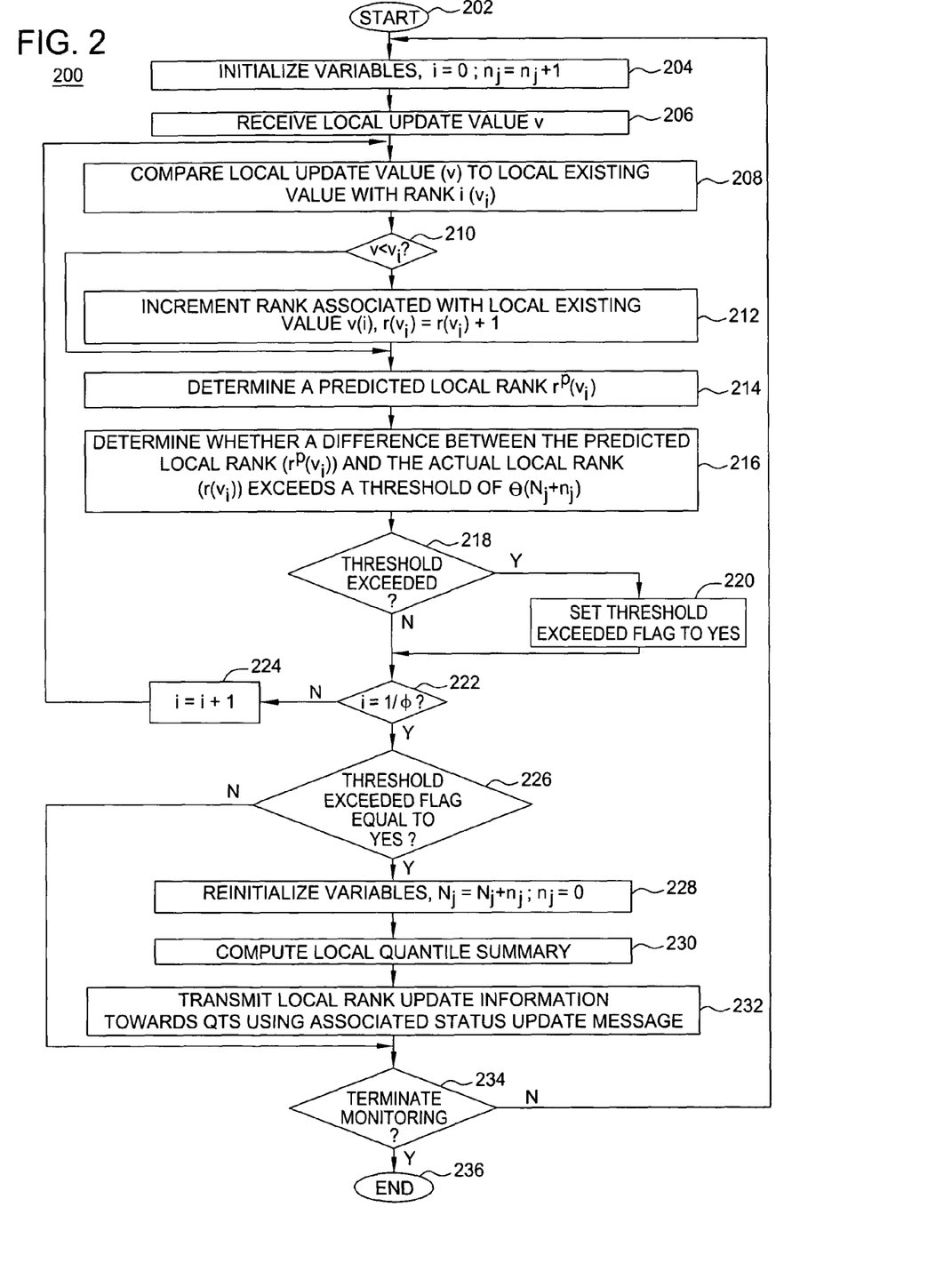
FIG. 2 depicts a flow diagram of a method according to one embodiment of the invention.

FIG. 2 depicts a flow diagram of a method according to one embodiment of the invention. Specifically, method 200 of FIG. 2 comprises a method for computing a local quantile summary. As such, in one embodiment, the methodology depicted and described with respect to FIG. 2 is performed on each of the RMs 110 depicted and described herein. Furthermore, although a portion of the steps are depicted as being performed serially, those skilled in the art will appreciate that at least a portion of the steps of method 200 may be performed contemporaneously, as well as in a different order then presented in FIG. 2. The method 200 is entered at step 202 and proceeds to step 204.

At step 204, a plurality of variables is initialized. A rank counter (i) is initialized to zero (i=0). A number of updates received by the $RM_j$ since the last communication from $RM_j$ to QTS 120 (denoted as $n_j$) is incremented by one ($n_j=n_j+1$). A number of updates received by $RM_j$ prior to the last communication from $RM_j$ to QTS 120 (denoted as $N_j$) is initialized to zero ($N_j=0$). A threshold exceeded flag is set to NO. Although described herein as requiring specific variables, those skilled in the art will appreciate that the methodology of FIG. 2 may be implemented using various other combinations of variables.

At step 206, a local update value v is received. As depicted in FIG. 1, local update value v is received by $RM_j$ (i.e., one of the RMs 110) via $LUS_j$ (i.e., one of the associated LUSs 112). As such, local update value v comprises a data element associated with local multi-set $S_j$. At step 208, the local update value v is compared to a local existing value of rank i. As described herein with respect to FIG. 2, the local existing value of rank i is denoted as $v_i$. At step 210, a determination is made as to whether local update value v is less than local existing value $v_i$. If local update value v is not less than local existing value $v_i$, method 200 proceeds to step 214. If local update value v is less than local existing value $v_i$, method 200 proceeds to step 212.

At step 212, the rank of local existing value $v_i$ is incremented by one ($r(v_i)=r(v_i)+1$). In other words, if local update value v received by $RM_j$ via $LUS_j$ is less than a local existing value $v_i$ previously received by $RM_j$, the rank associated with the previously received local existing value is incremented by one. As such, it follows that for any local existing value $v_i$ that is greater than the local update value v, the rank associated with the local existing values is incremented by one. At step 214, a predicted local rank of local existing value $v_i$ (denoted as $r^p(v_i)$) is determined. In one embodiment, the predicted local rank is computed using at least one prediction model, as described herein.

At step 216, a difference between a predicted local rank of the local existing value $r^p(v_i)$ and an actual local rank of the local existing value $r(v_i)$ is determined. At step 218, a determination is made as to whether the difference between the predicted local rank of the local existing value (denoted as $r^p(v_i)$) and the actual local rank of the local existing value (denoted as r(vi)) exceeds a threshold. In one embodiment, the threshold comprises $\Theta(N_j+n_j)$. If the threshold is not exceeded, method 200 proceeds to step 222. If the threshold is exceeded, the method 200 proceeds to step 220.

As described herein, in one embodiment, the threshold comprises $\Theta(N_j+n_j)$. In other words, in this embodiment, the threshold is proportional to the number of updates received by $RM_j$ prior to the last communication from $RM_j$ to QTS 120 (i.e., $N_j$) and the number of updates received by $RM_j$ since the last communication from $RM_j$ to QTS 120 (i.e., $n_j$). Similarly, in this embodiment, the threshold is proportional to $\Theta$, where $\Theta$ comprises an upper bound on the deviation of local quantiles as determined by $RM_j$ based on locally-observed updates since the last communication from the $RM_j$ to QTS 120.

At step 220, the threshold exceeded flag is set to YES. At step 222, a determination is made as to whether rank counter i is equal to a configured value. In one embodiment, the configured value is determined according to at least one error parameter. For example, in one embodiment, the configured value is equal to $1/\Phi$, where $\Phi$ comprises an error associated with the local quantile summaries $Q(S_j)$ communicated from $RM_j$ to QTS 120. As described herein, the error parameter $\Phi$ comprises a difference between allowed error tolerance $\epsilon$ associated with QTS 120 and error parameter $\Theta$. If rank counter i does not equal the configured value, method 200 proceeds to step 222. If rank counter i does equal the configured value, method 200 proceeds to step 226.

At step 224, rank counter i is incremented by one (i=i+1). The method 200 then returns to step 208, at which point local update value v is compared to a local existing value of the next highest rank. At step 226, a determination is made as to whether the threshold exceeded flag is equal to YES. If the threshold exceeded flag does not equal YES, method 200 proceeds to step 234. If the threshold exceeded flag does equal YES, method 200 proceeds to step 228.

At step 228, a plurality of variables is reinitialized. The number of local updates received by $RM_j$ since the last communication from $RM_j$ to QTS 120 ($n_j$) is reinitialized to zero ($n_j=0$). Furthermore, the number of local updates received by $RM_j$ prior to the last communication from $RM_j$ to QTS 120 ($N_j$) is updated to include the number of local updates received by $RM_j$ since the last communication by $RM_j$ to QTS 120 (i.e., $N_j=N_j+n_j$). In other words, in response to a communication from $RM_j$ to QTS 120, $RM_j$ increments the number of local updates received prior to the last communication to include the number of local updates received since the last communication (i.e., $N_j=N_j+n_j$) and resets the number of local updates received since the last communication to zero ($n_j=0$).

At step 230, a local quantile summary is computed. At step 232, local rank update information is transmitted towards QTS 120 using the associated $SUM_j$ (i.e., one of the SUMs 114). At step 234, a determination is made as to whether monitoring of local quantile values in the local update stream (i.e., $LUS_j$) is terminated. If the monitoring of local update values in the local update stream is not terminated, method 200 returns to step 204, at which point method 200 is repeated for another local update value received via $LUS_j$. If monitoring of local quantile values in the local update stream is terminated, method 200 proceeds to step 236 where the method 200 ends.

Although described herein with respect to an embodiment in which rank increases with a corresponding increase in value (i.e., a value of 10 has a larger rank than a value of 5), in another embodiment, the present invention is implemented for a system in which rank increases with a corresponding decrease in value (i.e., a value of 5 has a larger rank than a value of 10). In one such embodiment, an actual rank of an existing value is incremented in response to a determination that an update value is greater than the existing value. As such, in one embodiment, the present invention modifies at least one actual rank of at least one existing value in response to a determination that an update value is different than the at least one existing value.

In one embodiment, as depicted and described with respect to FIG. 2, let $Q(S_j)$ denote the local quantile summary computed by $RM_j$. Furthermore, let $Q(S_j)$ denote the collection of $\Phi$-quantile values (i.e., a current snapshot) of the $LUS_j$ monitored by $RM_j$. As such, $Q(S_j)$ comprises $[(1/\Phi)+1]$ values such that the quantile rank of the $i^{th}$ value $v_i$ in $LUS_j$ (denoted by $q_j(v_i)$) is $q_j(v_i)=i\Phi$ (or, equivalently, the absolute rank $r_j(v_i)=i\Phi N_j$), for $i=0, \ldots, (1/\Phi)$. As such, $v_0$ and $v_{(1/\Phi)}$ comprise the minimum value and maximum value observed in $LUS_j$, respectively.

As such, given a local update value v, two consecutive values $v_i$ and $v_{i+1}$ may be determined such that the approximate quantile rank of v in $LUS_j$ may be estimated as the average of the quantile rank of the $i^{th}$ value and the quantile rank of the $(i+1)^{th}$ value. Since the quantile rank of local update value v falls between the quantile rank of the $i^{th}$ value and the quantile rank of the $(i+1)^{th}$ value, respectively, in $LUS_j$, and the quantile rank difference between consecutive values is bounded by $\Phi$, the collection of $\Phi$-quantile values in the local quantile summary (i.e., $Q(S_j)=[v_i: i=0, \ldots, (1/\Phi)]$) comprises a $(\Phi/2)$-approximate local quantile summary for $LUS_j$.

As described herein with respect to FIG. 2, in one embodiment, $RM_j$ communicates local quantile summary $Q(S_j)$ and, optionally, an associated prediction model, to QTS 120. In one embodiment, communication of a local quantile summary to QTS 120 is performed in response to a determination that a difference between a predicted local rank and an actual local rank exceeds a threshold. Furthermore, since the size of $LUS_j$ at $RM_j$ comprises $N_j+n_j$ local updates, the corresponding size of the global update stream monitored by QTS 120 comprises $\Sigma_j(N_j+n_j)$.

As described herein, after transmitting local quantile summary $Q(S_j)$ to QTS 120, $RM_j$ continuously monitors the state of its local quantile values $v_i$ in $LUS_j$. As such, for each local quantile value $v_i$, $RM_j$ monitors both the actual absolute rank $r_j(v_i)$, and the predicted absolute rank $r_j^p(v_i)$ determined using the prediction model exchanged between $RM_j$ and QTS 120. As such, although described herein with respect to absolute ranks, the methodologies depicted and described herein with respect to FIG. 2 may be implemented using quantile ranks as well.

Furthermore, as described herein, communication from $RM_j$ to QTS 120 is triggered only if a difference between the predicted local rank of the $i^{th}$ value and the actual local rank of the $i^{th}$ value exceeds a threshold. In one embodiment, communication from $RM_j$ to QTS 120 is triggered if the threshold exceeds $\Phi(N_j+n_j)$. It should be noted that this condition is sufficient to provide strong $\epsilon$-approximation guarantees for rank estimates and quantile estimates based on the local quantile summary $Q(S_j)$ last communicated from $RM_j$ to QTS 120.

Figure 3:
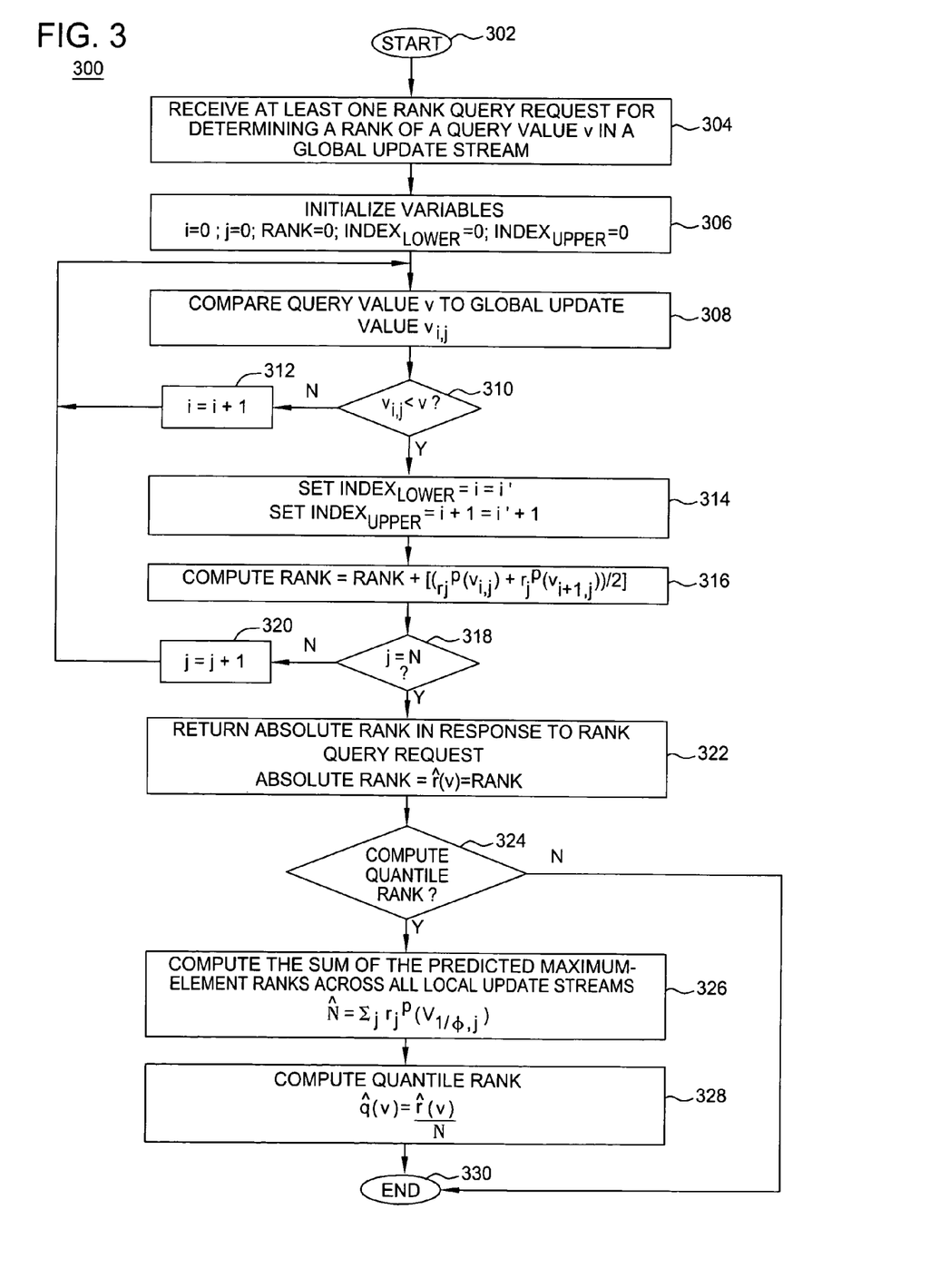
FIG. 3 depicts a flow diagram of a method according to one embodiment of the invention.

FIG. 3 depicts a flow diagram of a method according to one embodiment of the invention. Specifically, method 300 of FIG. 3 comprises a method for determining a rank of a query value. As such, in one embodiment, the methodology depicted and described with respect to FIG. 3 is performed by QTS 120 depicted and described herein. Furthermore, although a portion of the steps are depicted as being performed serially, those skilled in the art will appreciate that at least a portion of the steps of method 300 may be performed contemporaneously, as well as in a different order then presented in FIG. 3. The method 300 is entered at step 302 and proceeds to step 304.

At step 304, at least one rank query request for determining a rank of a query value v in a global update stream is received. In one embodiment, the rank query request is received by a quantile tracking system (illustratively, QTS 120). In one embodiment, a rank query request is initiated automatically by at least one remote system. In another embodiment, a rank query request is initiated manually by a user via at least one user interface associated with at least one of: QTS 120, at least one system in communication with QTS 120, and the like.

At step 306, a plurality of variables is initialized. A rank counter (i) is initialized to zero ($i=0$). A remote monitor identifier (j) is initialized to zero ($j=0$). A rank (RANK) is initialized to zero (RANK=0). A lower index ($INDEX_{LOWER}$) and upper index ($INDEX_{UPPER}$) are both initialized to zero ($INDEX_{LOWER}=0$; $INDEX_{UPPER}=0$). At step 308, query value v is compared to global update value $v_{i,j}$. At step 310, a determination is made as to whether global update value $v_{i,j}$ is less than the query value v. If the global update value is not less than the query value method 300 proceeds to step 312, at which point the rank counter (i) is incremented by one ($i=i+1$). The method 300 then returns to step 308. If the global update value is less than query value v, method 300 proceeds to step 314.

At step 314, the lower index ($INDEX_{LOWER}$) is set to the rank counter ($INDEX_{LOWER}=i$). The upper index ($INDEX_{UPPER}$) is set to the rank counter incremented by one ($INDEX_{UPPER}=i+1$). In other words, the lower index is set equal to the rank of the global update value immediately preceding the query value v, and the upper index is set equal to the rank of the global update value immediately following the query value v. For purposes of simplicity, it should be noted that during rank computation, the lower index (INDEX$_{LOWER}$) is denoted as i' and the upper index (INDEX$_{UPPER}$) is denoted as i'+1. At step 316, the rank is computed as: RANK=RANK+$[(r_j^p(v_{i',j})+r_j^p(v_{i'+1,j}))/2]$.

At step 318, a determination is made as to whether the local quantile summary $Q(S_N)$ associated with the final remote monitor $RM_N$ (i.e., RM 110$_N$) has been processed. In other words, since the remote monitor counter is denoted as j, and there are N total RMs in communication with the QTS 120, a determination is made as to whether j=N. If the local quantile summary of the $RM_N$ has not been processed (i.e., j≠N) method 300 proceeds to step 320, at which point remote monitor counter (j) is incremented by one (j=j+1). The method 300 then returns to step 308. If the local quantile summary associated with the $RM_N$ has been processed (i.e., j=N), method 300 proceeds to step 322.

At step 322, the estimated absolute rank r̂(v) associated with query value v is returned in response to the rank query request. The estimated absolute rank r̂(v) comprises the value of the RANK variable at the time at which j=N. In other words, the estimated absolute rank r̂(v) comprises a summation of estimated ranks associated with the respective local quantile summaries $Q(S_j)$ received from the RMs 110. At step 324, a determination is made as to whether an estimated quantile rank associated with query value v is computed. If an estimated quantile rank associated with query value v is not computed, method 300 proceeds to step 330 where method 300 ends. If an estimated quantile rank associated with query value v is computed, method 300 proceeds to step 326.

At step 326, the sum of the predicted maximum-element ranks across all local update streams (LUSs 112) is computed. The sum of the predicted maximum-element ranks across all local update streams (denoted as N̂) is computed according to the following equation: $\hat{N}=\Sigma_j r_j^p(v_{1/\Phi,j})$. At step 328, the estimated quantile rank of query value v (denoted as q̂(v)) is computed according to the following equation: q̂(v)=r̂(v)/N̂, where r̂(v) comprises the estimated absolute rank associated with query value v and N̂ comprises the sum of the predicted maximum-element ranks across all local update streams. The method 300 then proceeds to step 330 where the method 300 ends.

As described herein, the global quantile summary Q(S) is utilized by QTS 120 for responding to query requests. The global quantile summary Q(S) comprises a combination of the respective local quantile summaries $Q(S_j)$ associated with the RMs 110. In one embodiment, in which the same value occurs many times in the global update stream, the absolute rank of that value comprises a range. Furthermore, in one embodiment, the prediction models associated with the respective RMs 110 are utilized for responding to query requests.

It should be noted that the absolute ranks for value v across different RMs are additive (i.e., the overall rank comprises the summation of the per-RM ranks) and, further, that by the definition of the bounding quantile values, for any query value v, the estimated absolute rank r̂(v) at QTS 120 comprises a (Φ+Θ)-approximation of the actual absolute rank r(v) of query value v in the global update stream. In other words, using the methodologies of the present invention, the following inequality holds: r(v)−(Φ+Θ)N≦ r̂(v)≦r(v)+(Φ+Θ)N.

In one embodiment, using the methodologies of the present invention, identical error tolerance ε=Φ+Θ is allocated across each of the RMs 110. It should be noted, however, that in one further embodiment, a distinct total-error threshold $\epsilon_j=\Phi_j+\Theta_j$ may be allocated to each $RM_j$. In one embodiment, the per-RM error distribution between $\Phi_j$ and $\Theta_j$ may be dynamically allocated based on locally-observed behavior associated with each of the respective RMs 110.

Furthermore, although described herein with respect to approximation guarantees for absolute rank estimates at QTS 120, the methodologies of the present invention may be used to obtain strong approximation guarantees for quantile rank estimates at QTS 120. In one such embodiment, approximation guarantees for quantile rank estimates at the QTS 120 may employ a slightly tighter upper bound of $\Phi(1+\Theta)(N_j+n_j)$ on the range between the consecutive quantile rank predictions. Furthermore, the upper bound associated with the absolute rank estimates, the upper bound associated with the quantile rank estimates, and various other error bounding conditions may be satisfied using at least one of a plurality of prediction models.

In one embodiment, in order to monitor quantile values at each of the RMs 110, each RM 110 maintains an array comprising the current ranks of the local update values in the local quantile summary $Q(S_j)$. As described herein, various prediction models may be employed (by both the RMs 110 and QTS 120) for describing local update behaviors at the RMs 110. In one embodiment, prediction models comprise a portion of the information exchanged between the RMs 110 and QTS 120, thereby ensuring that the RMs 110 and the QTS 120 are synchronized with respect to rank prediction computations.

Furthermore, as described herein, at least one prediction model may be used for achieving stability in the distributed monitoring environment such that the communication costs associated with the exchange of information between the RMs 110 and QTS 120 is minimized. As described herein, at least one of a plurality of prediction models may be utilized for performing the methodologies of the present invention. As such, the prediction models used by the RMs 110 may vary across the RMs 110. Furthermore, the prediction models are adaptable in response to locally-observed conditions detected by the RMs 110.

In one embodiment, a prediction model comprises a zero-information prediction model. In this embodiment, the RMs 110 and QTS 120 assume that there are no further local updates received by the RMs 110 via the LUSs 112. In other words, the RMs 110 and QTS 120 assume that the absolute ranks associated with quantile values $v_{i,j}$ in the respective local quantile summaries $Q(S_j)$ last communicated by the RMs 110 to QTS 120 remain substantially the same. Under such predictions, no additional information must be exchanged between the RMs 110 and QTS 120 in order to accurately estimate absolute ranks and quantile ranks in response to query requests. Furthermore, under such predictions, the predicted absolute rank is determined as $r_j^p(v_{i,j})=i\Phi N_j$.

In another embodiment, a prediction model comprises a synchronous-updates prediction model. In this embodiment, an assumption is made that each of the RMs 110 reads in new data elements via the respective LUSs 112 periodically (i.e., one data element update at each time step). For example, the RMs 110 may periodically poll associated network elements, sensor nodes and the like once each second. Furthermore, in one embodiment, a further assumption is made that the quantile ranks of the quantile values $v_{i,j}$, and the local quantile summary $Q(S_j)$ last communicated from $RM_j$ to QTS 120, remain substantially the same.

In other words, for each $RM_j$, letting $t_j$ denote the number of time steps since the most recent quantile summary $Q(S_j)$ was communicated from $RM_j$ to QTS 120, the predicted absolute ranks $r_j^P(v_{i,j})$ for $RM_j$ are computed according to: $r_j^P(v_{i,j})=i\Phi(N_j+t_j)$, for $i=0,\ldots,1/\Phi$. As such, since both the RMs 110 and QTS 120 employ the same synchronicity assumption, this embodiment eliminates a need to exchange prediction model information between the RMs 110 and QTS 120, further reducing communication costs associated with the methodologies of the present invention. In one embodiment, the RMs 110 and QTS 120 are fully synchronized such that QTS 120 may compute predicted ranks $r_j^P(v_{i,j})$ in order to respond to rank query requests.

In another embodiment, a prediction model comprises an update-rates prediction model. In this embodiment, an assumption is made that local updates are observed at each $RM_j$ at a local uniform rate (denoted as $d_j$). In one such embodiment, local uniform rate $d_j$ completely specifies the prediction model for $RM_j$ and, as such, is exchanged between $RM_j$ and QTS 120 during communications between $RM_j$ and QTS 120. For example, local uniform rate $d_j$ may be defined as a historic average over the entire history of updates at $RM_j$, as an average update rate over a recent window of observed update behavior at $RM_j$, using a time-of-day based value from a recent history table, and the like.

Although the specific method of estimating the update rate $d_j$ (at either the RMs 110 or QTS 120) has no effect on the accuracy of the local quantile monitoring, the accuracy of the $d_j$ estimates is inversely proportional to the communication costs associated with exchanging information between the RMs 110 and QTS 120 in support of the methodology of the present invention. In other words, accurate local uniform rate $d_j$ estimates facilitate reductions in communication costs.

In one embodiment, as in the synchronous-updates prediction model, the update-rates prediction model assumes that the quantile ranks associated with the most recent local quantile summaries $Q(S_j)$ remain substantially the same. As such, letting $t_j$ denote the number of time steps since the last communication between $RM_j$ and QTS 120, predicted absolute ranks $r_j^P(v_{i,j})$ for $RM_j$ are computed according to: $r_j^P(v_j)=i\Phi(N_j+d_jt_j)$. Thus, assuming that distributions (i.e., local quantile values) at the RMs 110 remain substantially the same, and the local update rates are substantially stable, the update-rates prediction model achieves stability such that communication between the RMs 110 and QTS 120 is minimized (and becomes unnecessary in the long run).

As described herein, the update-rates prediction model captures both the zero-information prediction model ($d_j=0$ for all j) and the synchronous-updates prediction model ($d_j=1$ for all j). Furthermore, assuming that the local rank deviations are bounded, each of the prediction models described herein satisfies the upper bounds on the range between consecutive predicted ranks. As such, using each of the prediction models described herein, maintaining the local conditions that the difference between the predicted local rank and the actual local rank does not exceed a threshold of $\Theta(N_j+n_j)$, the range of predicted ranks $(r_j^P(v_{i+1,j})-r_j^P(v_{i,j}))$ is upper-bounded by $\Phi(1+\Theta)(N_j+n_j)$ at all times. In other words, each prediction model described herein guarantees a $(\Phi+\Theta)$-approximate absolute rank estimate $\hat{r}(v)$ at QTS 120, as long as local rank $r_j(v_{i,j})$ in the local update stream does not deviate from the predicted local rank $r_j^P(v_{i,j})$ by more than $\Theta(N_j+n_j)$.

In one further embodiment, at least a portion of the prediction models described herein may be adapted to account for various second-order effects. For example, a second-order effect comprises modeling the rate of change of local update rates (i.e., the acceleration of the local updates as opposed to the speed of the local updates). In one embodiment, second-order effects may be learned locally (i.e., at the RMs 110 or at QTS 120) using at least one of a plurality of methods (e.g., averaging over sliding windows, querying recent history tables, linear-regression methods, high-order regression methods, and like methods).

As such, new absolute rank predictions $r_j^P(v_{i,j})$ may be determined based on measurable parameters exchangeable between the RMs 110 and QTS 120. In other words, provided that a prediction model ensures that the predicted rank ranges $(r_j^P(v_{i+1,j})-r_j^P(v_{i,j}))$ remain bounded by $\Phi(1+\Theta)(N_j+n_j)$, the quality of the approximate query answers computed by QTS 120 may be guaranteed. In one embodiment, ensuring that that the predicted rank ranges remain bounded by $\Phi(1+\Theta)(N_j+n_j)$ comprises at least one of: demonstrating that the condition always holds, explicitly checking the condition at the $RM_j$ and forcing communication in response to a determination that the condition is violated, and the like.

In one embodiment, in which maintaining complete local quantile distributions is difficult (e.g., at least a portion of the LUSs 112 comprise massive rapid-rate updates, at least a portion of the RMs 110 have resource limitations, and the like), at least a portion of the RMs 110 monitor the respective local quantiles approximately over the LUSs 112. In one embodiment, such approximate monitoring methods are deterministic (e.g., retaining carefully chosen subsets of the full LUS distribution), based on randomized-sketching techniques, and the like. As such, given $LUS_j$ (of size $N_j$) and an error bound of a, such methods are operable for tracking quantile information and reporting any requested quantile with an error bound by $\alpha N_j$.

As such, using such an approximate quantile tracking algorithm with error a at the RMs 110, when computing the local quantile summary $Q(S_j)$, the guarantee that $r_j(v_{i,j})=i\Phi N_j$ is replaced by a guarantee that $r_j(v_{i,j})$ falls within the range $i\Phi N_j \pm \alpha N_j$. As such, for any rank query value v, absolute rank estimate $\hat{r}(v)$ determined by QTS 120 comprises a $(\Phi+\Theta+\alpha)$-approximation of actual absolute rank $r(v)$ of query value v in the global update stream. As such, the following inequality holds: $[r(v)-(\Phi+\Theta+\alpha)N]\leq \hat{r}(v) \leq [r(v)+(\Phi+\Theta+\alpha)N]$.

In other words, tracking local quantiles approximately (to within an $\alpha$ error) at each RM 110 implies an additional a error for the approximate global rank estimates determined by QTS 120. Furthermore, such approximations result in a drastic reduction in the local space requirements at each of the RMs 110. As such, given a fixed amount of memory (m) available at each of the RMs 110, and a desired global error tolerance $\epsilon$, error parameters $\Phi$, $\Theta$, and a may be configured in a manner tending to minimize communication costs associated with communications between the RMs 110 and QTS 120. It should be noted that in this embodiment, $\epsilon=(\Phi+\Theta+\alpha)$ and $m \geq O(1/\Phi+1/\Theta)$.

In one embodiment, the methodologies of the present invention may be used for tracking heavy hitters. In general, heavy hitters comprise values that occur more than some fraction f of the time (i.e., the count is at least equal to f*N). As such, the methodologies described herein for continuously tracking the ranks of data elements may be extended for use in identifying approximate heavy hitters. Assuming that absolute rank estimate $\hat{r}(v)$ provides an estimate of the maximum rank of value v, then $\hat{r}(v)-\hat{r}(v-1)$ comprises an estimate of the count of value v (with error at most $2\epsilon N$). As such, QTS 120 continuously maintains on the order of $O(\epsilon)$ approximate counts of each value (i.e., the approximate count of any range of contiguous items). Thus, QTS 120 may respond to count query requests for determining a count associated with a query value v.

In one further embodiment, each of the RMs 110 monitors the heavy hitters associated with the LUSs 112, and only communicates to QTS 120 when the count of a value v differs by more than $\Theta(N_j+n_j)$ from the associated predicted count. In one embodiment, in order to minimize communications between the RMs 110 and QTS 120, at least one of the prediction models described herein may be used for predicting the total counts of query values (i.e., for monitoring the heavy hitters received by the RMs 110 via the LUSs 112).

As depicted and described herein, distributed computing environment 100 of FIG. 1 comprises a flat hierarchy of nodes (i.e., RMs 110). In another embodiment, the methodologies of the present invention may be used for computing local quantile summaries, responding to rank query requests, and performing like functions in a tree-structured hierarchy of nodes. In one such embodiment, the distributed computing environment 100 of FIG. 1 may be extended to represent a tree-structured hierarchy of nodes such that QTS 120 comprises the root node, which effectively tracks approximate quantiles of the update streams observed at the leaf nodes of the hierarchy (e.g., at RMs in various levels of the hierarchy).

As such, assuming that the distributed monitoring hierarchy comprises h+1 levels, (with the root node at level zero and the leaf nodes at level h) the methodologies of the present invention may be used for computing quantiles over the union of LUSs observed at the leaf nodes. In one such embodiment, the methodologies of the present invention are performed between each internal node and the associated children. In other words, each internal node of the hierarchy monitors the approximate quantiles of its children node(s), and transmits the relevant information to its parent node upon detecting that its locally observed quantiles (which summarize the quantiles of all LUSs in its sub-tree) violate a specific deviation bound with respect to their corresponding predicted values.

In one embodiment, similar to allocation of error tolerance $\epsilon=\Phi+\Theta$ to each RM in a single-level embodiment, a similar error tolerance $\epsilon_s=\Phi_s+\Theta_s$ is allocated to each RM in level s of the hierarchy. In this embodiment, the accuracy of local quantile estimates for each RM at level s−1 of the hierarchy comprises $\alpha_{s-1}=\alpha_s+\Phi_s+\Theta_s$. In this embodiment, by summing across all levels of the hierarchy, the total quantile tracking error at the root node comprises $$\varepsilon = \alpha_0 = \alpha + \sum_{s=1}^{h} \Phi_s + \Theta_s.$$

In one such embodiment, assuming fixed summary error $\alpha$, the $\Phi_s$ and $\Theta_s$ values may be optimized in a manner tending to minimize a maximum transmission cost and a total communication cost.

Although primarily described herein with respect to a communications network monitoring environment, the present invention may be used in various other distributed monitoring environments. For example, the methodologies of the present invention may be used in a network of physiological, seismic, and acoustic sensors deployed for habitat, environmental, and health monitoring. Similarly, for example, the methodologies of the present invention may be used in a satellite-based systems deployed for atmospheric monitoring of weather patterns. Similarly, the methodologies of the present invention may be utilized in various other environments, such as traffic grid environments, power company environments (e.g., monitoring power grids), and the like.

Figure 4:
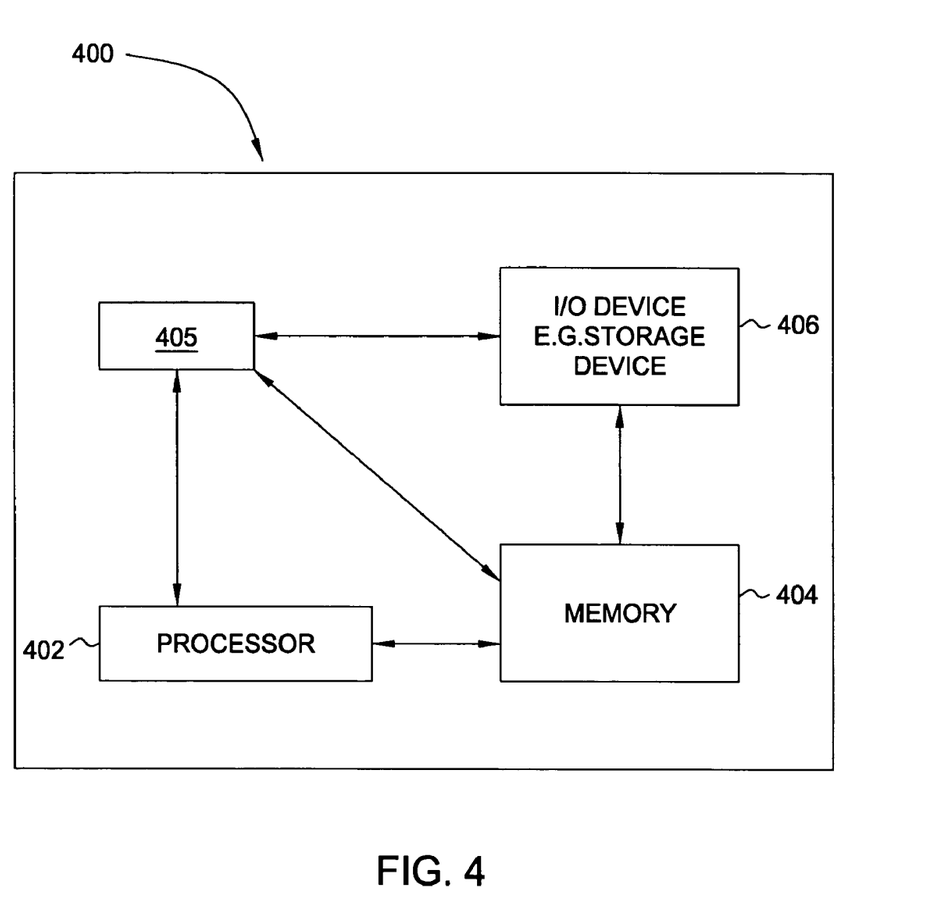
FIG. 4. depicts a high-level block diagram of a general purpose computer suitable for use in performing the functions described herein.

FIG. 4 depicts a high-level block diagram of a general purpose computer suitable for use in performing the functions described herein. As depicted in FIG. 4, system 400 comprises a processor element 402 (e.g., a CPU), a memory 404, e.g., random access memory (RAM) and/or read only memory (ROM), a quantile monitoring and approximation module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present quantile monitoring and approximation module or process 405 can be loaded into memory 404 and executed by processor 402 to implement the functions as discussed herein. As such, quantile monitoring and approximation process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for computing a local quantile summary, comprising:

receiving an update value via an update stream;

determining an actual rank of a local quantile value using said update value;

computing a predicted rank of said local quantile value using a prediction model;

computing a local quantile summary in response to a determination that a difference between said actual rank of said local quantile value and said predicted rank of said local quantile value exceeds an update threshold, wherein said local quantile summary is computed using a processor; and propagating the computed local quantile summary toward a remote system, wherein said remote system is configured for responding to a rank query request using said local quantile summary and information associated with said prediction model, wherein said responding comprises:

determining, for each of at least one remote monitor, a predicted lower-bound rank value and a predicted upper-bound rank value, wherein said predicted lower-bound rank value and said predicted upper-bound rank value are determined according to at least one respective prediction model used by each of said at least one remote monitor to compute at least one local quantile summary;

computing a predicted average rank value for each of said at least one remote monitor using said at least one predicted lower-bound rank value and said at least one predicted upper-bound rank value associated with respective said at least one remote monitor; and computing said absolute rank of said query value using said at least one predicted average rank value associated with respective said at least one remote monitor.

2. The method of claim 1, wherein said update threshold is configured in a manner tending to minimize at least one of an error threshold associated with said predicted rank and a probability of computing said local quantile summary.

3. The method of claim 2, further comprising wherein said determining an actual rank of a local quantile value using said update value comprises:
  comparing said update value to said local quantile value; and
  if said update value is less than said local quantile value, incrementing a current rank of said local quantile value and selecting said incremented current rank of said local quantile value as said actual rank of said local quantile value;
  if said update value is not less than said local quantile value, determining a current rank of said local quantile value and selecting said current rank of said local quantile value as said actual rank of said local quantile value.

4. The method of claim 1, further comprising:
  adapting said prediction model in a manner tending to minimize a probability of computing said local quantile summary.

5. The method of claim 1, further comprising:
  propagating information associated with said prediction model towards said at least one remote system.

6. A method for determining a rank of a query value, comprising:
  receiving a rank query request, said rank query request for determining said rank of said query value in a global quantile summary, wherein said global quantile summary comprises at least one local quantile summary associated with at least one remote monitor;
  determining, for each of said at least one remote monitor, a predicted lower-bound rank value and a predicted upper-bound rank value, wherein said predicted lower-bound rank value and said predicted upper-bound rank value are determined according to at least one respective prediction model used by each of said at least one remote monitor to compute said at least one local quantile summary;
  computing a predicted average rank value for each of said at least one remote monitor using said at least one predicted lower-bound rank value and said at least one predicted upper-bound rank value associated with respective said at least one remote monitor; and
  computing, using a processor, said rank of said query value using said at least one predicted average rank value associated with respective said at least one remote monitor.

7. The method of claim 6, further comprising:
  responding to said rank query request using said rank of said query value.

8. The method of claim 6, wherein said rank of said query value comprises an absolute rank.

9. The method of claim 8, further comprising:
  computing at least one of a quantile rank associated with said query value and a count associated with said query value using said absolute rank associated with said query value, said count operable for determining whether said query value comprises a heavy-hitter.

10. The method of claim 9, wherein said computing said quantile rank comprises:
  computing a summation of at least one predicted maximum-value rank across at least one update stream associated with said at least one remote monitor; and
  dividing said absolute rank associated with said query value by said summation.

11. The method of claim 6, further comprising:
  receiving, from at least one of said at least one remote monitor, at least one of at least one local quantile summary and at least one prediction model.

12. A system for determining a rank of a query value using a plurality of predicted ranks of a respective plurality of quantile values, comprising:
  a plurality of remote monitors, wherein each of said remote monitors is configured for computing a local quantile summary in response to a determination that a local quantile value monitored by the remote monitor fails to satisfy a local constraint, wherein for each of said remote monitors the determination as to whether a local quantile value fails to satisfy a local constraint is performed using an associated prediction model; and
  a quantile tracking system in communication with each of said remote monitors, wherein said quantile tracking system comprises a processor, wherein said quantile tracking system is configured for receiving local quantile summaries from each of said remote monitors, wherein said quantile tracking system is configured for determining said rank of said query value using said predicted ranks of said quantile values, wherein said predicted ranks of said quantile values are computed by said quantile tracking system using respective local quantile summaries received from said remote monitors and respective prediction models used by said remote monitors, wherein said quantile tracking system is configured for determining said rank of said query value by:
    determining, for each of said remote monitors, a predicted lower-bound rank value and a predicted upper-bound rank value for said remote monitor using a prediction model used by said remote monitor to compute a local quantile summary;
    computing a predicted average rank value for each of said remote monitors using said predicted lower-bound rank value and said predicted upper-bound rank value associated with said respective remote monitor; and
    computing said rank of said query value using said predicted average rank values computed for said respective remote monitors.

13. The system of claim 12, wherein, at each of said remote monitors, a local quantile summary is computed according to a method comprising:
  receiving update values via an update stream associated with said remote monitor;
  for each received update value, performing the following for each of a plurality of local quantile values maintained at said remote monitor:
    determining an actual rank of said local quantile value using said update value;
    computing a predicted rank of said local quantile value using a prediction model; and
    determining whether a difference between said actual rank of said local quantile value and said predicted rank of said local quantile value exceeds an update threshold; and
  computing a local quantile summary in response to a determination that for at least one of said local quantile values said difference between said actual rank of said local quantile value and said predicted rank of said local quantile value exceeds said update threshold.

14. The system of claim 13, wherein said update threshold is configured in a manner tending to minimize at least one of at least one error threshold associated with said predicted ranks of said local quantile values and at least one probability of computing said local quantile summary.

15. The system of claim 13, wherein each of said remote monitors is further configured for:

transmitting local rank information towards said quantile tracking system, wherein said local rank information comprises at least one of: a local quantile summary computed by said remote monitor and said prediction model used by said remote monitor to determine when to compute said local quantile summary.

16. The system of claim 12, wherein said rank of said query value comprises an absolute rank.

17. The system of claim 16, further comprising:
computing at least one of a quantile rank associated with said query value and a count associated with said query value using said absolute rank associated with said query value; wherein said count is operable for determining whether said query value comprises a heavy-hitter; and said computing said quantile rank comprises:
computing a summation of at least one predicted maximum-value rank across a plurality of update streams associated with said respective plurality of remote monitors; and dividing said absolute rank associated with said query value by said summation.

* * * * *